(12) United States Patent
Roberts

(10) Patent No.: US 9,649,982 B1
(45) Date of Patent: May 16, 2017

(54) WRECKER WITH CATWALK ASSEMBLY

(71) Applicant: Donald D. Roberts, Bean Station, TN (US)

(72) Inventor: Donald D. Roberts, Bean Station, TN (US)

(*) Notice: Subject to any disclaimer, the term of this patent is extended or adjusted under 35 U.S.C. 154(b) by 0 days.

(21) Appl. No.: 14/725,410

(22) Filed: May 29, 2015

Related U.S. Application Data

(60) Provisional application No. 62/005,036, filed on May 30, 2014.

(51) Int. Cl.
*B60P 3/12* (2006.01)
*B60R 3/00* (2006.01)

(52) U.S. Cl.
CPC .............. *B60R 3/005* (2013.01); *B60P 3/125* (2013.01)

(58) Field of Classification Search
CPC ................................ B60R 3/005; B60P 3/125
USPC ....................................................... 280/402
See application file for complete search history.

(56) References Cited

U.S. PATENT DOCUMENTS

| | | | | |
|---|---|---|---|---|
| 4,108,253 A * | 8/1978 | Woodford, II | ........ | E21B 19/087 173/189 |
| 4,473,334 A * | 9/1984 | Brown | ..................... | B60P 3/125 212/195 |
| 4,634,337 A * | 1/1987 | Hamman | ................ | B60P 3/125 212/264 |
| 4,637,623 A * | 1/1987 | Bubik | ..................... | B60P 3/125 280/204 |
| 6,543,749 B1 * | 4/2003 | Duvall | ...................... | B60P 3/12 254/323 |
| 6,585,285 B2 * | 7/2003 | Koch | ................... | B62D 63/061 224/924 |

* cited by examiner

*Primary Examiner* — Jacob Knutson
(74) *Attorney, Agent, or Firm* — Allen Dyer Doppelt & Gilchrist

(57) ABSTRACT

A wrecker includes a frame, a cab forwardly-mounted on the frame, recovery equipment rearwardly mounted on the frame, and a catwalk assembly located therebetween. The catwalk assembly includes a platform extending between, and accessible for foot access from, both sides of the wrecker.

8 Claims, 1 Drawing Sheet

WRECKER WITH CATWALK ASSEMBLY

CROSS-REFERENCE TO RELATED APPLICATION

This application claims the benefit of U.S. Provisional Patent Application Ser. No. 62/005,036, filed on May 30, 2014, the contents of which are herein incorporated by reference in their entirety.

FIELD OF THE INVENTION

The present invention relates to wreckers, and more particularly, to improving the safety and utility thereof.

BACKGROUND OF THE INVENTION

An exemplary wrecker 110 is depicted in FIG. 3. Although there are many vehicle makes and models employed as wreckers, and the recovery equipment employed can vary considerably between wreckers, in general the wrecker 110 will have a forward-mounted cab 114 and rear-mounted recovery equipment 116 on a common frame. The cab 114 typically sits over or behind the motor and houses the operator when the wrecker is driven. The rear-mounted recovery equipment 116 can vary more considerably, but will often include one or more booms, wheellifts, winches and/or vehicle recovery beds, as well as operator controls, and storage compartments. For greater flexibility in recovering vehicles, the wrecker 110 may also be equipped with a side-puller 120, usually mounted on the frame immediately rearward of the cab 114 and forward of the rear-mounted recovery equipment 116. While wreckers like the wrecker 110 have repeatedly proven their usefulness over the years, further improvements are possible.

SUMMARY OF THE INVENTION

In view of the foregoing, it is an object of the present invention to provide a wrecker with a catwalk assembly. According to an embodiment of the present invention, a wrecker includes a frame, a cab forwardly-mounted on the frame, recovery equipment rearwardly mounted on the frame, and a catwalk assembly located therebetween. The catwalk assembly includes a platform extending between, and accessible for foot access from, both sides of the wrecker.

According to an aspect of the present invention, the catwalk assembly includes at least one step on each side of the platform at a level therebelow. According to another aspect of the present invention, the wrecker further includes a side puller mounted immediately rearward of the cab, the catwalk assembly being mounted between the side puller and the recovery equipment.

These and other objects, aspects and advantages of the present invention will be better appreciated in view of the drawings and following detailed description of preferred embodiments.

DETAILED DESCRIPTION OF PREFERRED EMBODIMENTS

Figure 1:
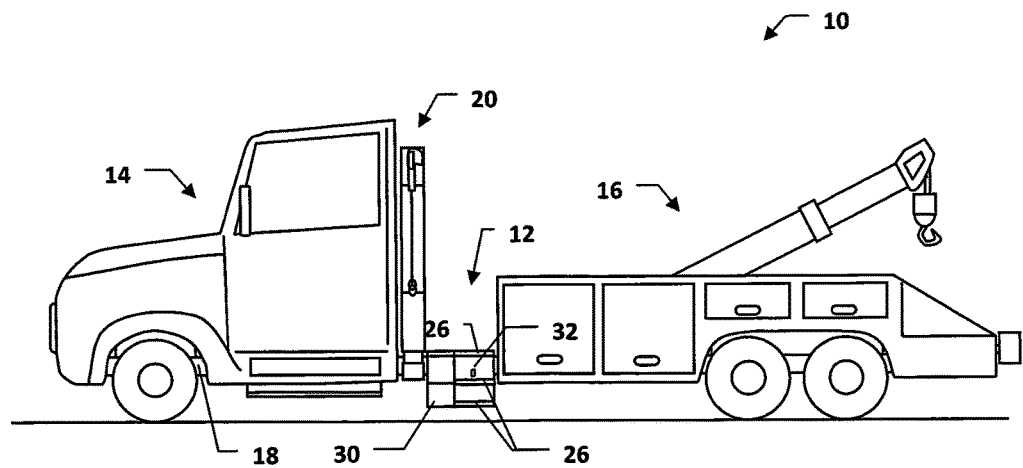
FIG. 1 is a side view of a wrecker with a catwalk assembly, according to an embodiment of the present invention.

According to an embodiment of the present invention, referring to FIG. 1, a wrecker 10 includes a catwalk assembly 12 mounted between a cab 14 and recovery equipment 16. The catwalk assembly 12, cab 14 and recovery equipment 16 are commonly mounted between forward and rear ends of a longitudinally extending wrecker frame 18. In addition to the recovery equipment 16, the wrecker 12 can further include a side puller 20, which preferably is immediately rearward of the cab 14 and forward of the catwalk assembly 12.

The catwalk assembly 12 extends between, and is accessible from, both sides of the wrecker 10. Advantageously, the catwalk assembly 12 allows an operator to traverse the wrecker from side to side without having to climb through the cab 14 or over the recovery equipment 16, or to walk around the front or rear end.

Figure 2:
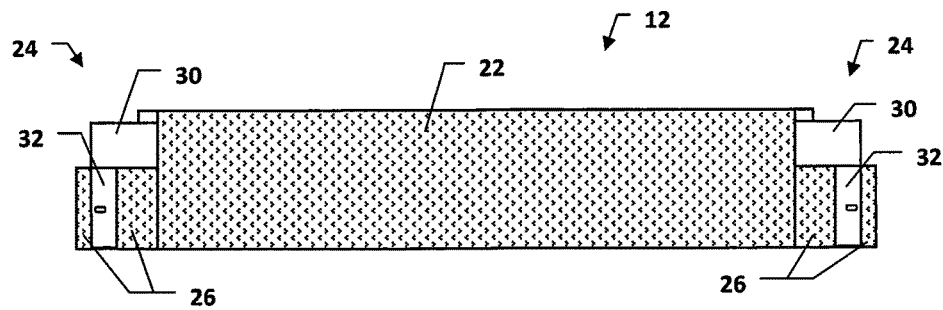
FIG. 2 is a top view of the catwalk assembly of FIG. 1.
Figure 3:
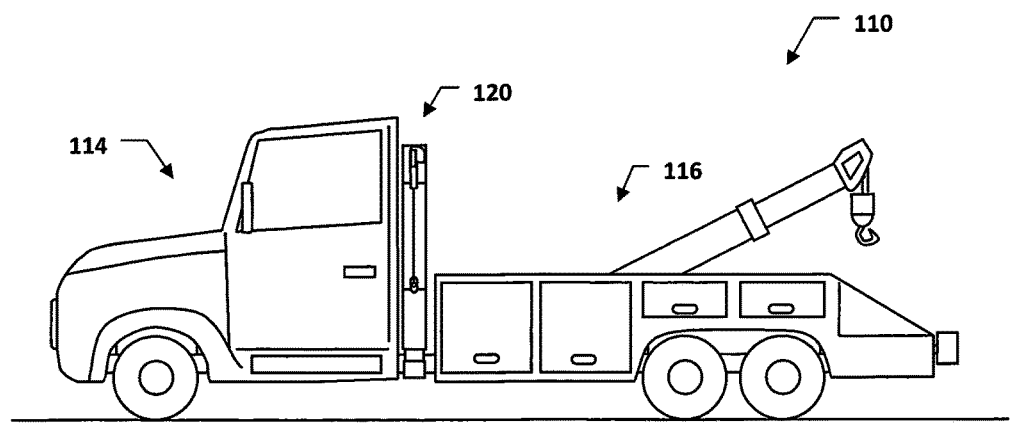
FIG. 3 is a side view of an exemplary conventional wrecker.

Referring also to FIG. 2, the catwalk assembly 12 includes a platform 22 that is preferably substantially flat (although advantageously textured with a non-skid surface to reduce the likelihood of slippage) and below the level of the adjacent recovery equipment 16. Most preferably, the platform is mounted directly to the frame 18, or no more than one foot thereabove.

End units 24 are located at opposite ends of the platform 22. Each end unit 24 includes one or more steps 26, some of which are below the level of the platform 22 to facilitate access thereto. Additionally, open storage bins 30 and/or closed storage compartments 32 can be located on the end units 24.

In use, a wrecker operator accesses the catwalk assembly 12 via the steps 32 and traverses the wrecker 10 from side to side via the platform 22. It will be appreciated that this affords far greater convenience for the wrecker operator than conventional arrangements. This can be particularly helpful where access around the front or rear of the wrecker is obstructed by terrain or other obstacles.

Additionally, wreckers are often required by circumstances to park on narrow shoulders very close to a highway or other road, at night, in low visibility conditions and/or adjacent to fast-moving traffic. As a result, the wrecker operator might be in considerable danger if he or she needs to stand on or near the road beside the wrecker. The catwalk assembly 12 offers the operator an open and ready means of egress if it becomes necessary to quickly get out of the path of an incautious driver.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A wrecker comprising:
   a frame extending between forward and rear ends;
   a cab mounted proximate the forward end of the frame;
   recovery equipment mounted to the frame rearwardly of the cab; and
   a catwalk assembly mounted to the frame rearwardly of the cab and forwardly of the recovery equipment and accessible from left and right sides of the wrecker to facilitate personnel movement therebetween; a side puller mounted immediately to the frame rearwardly of the cab and forwardly of the catwalk assembly; wherein the catwalk assembly offers a continuously accessible, upwardly-facing, walking surface between the left and right sides of the wrecker that is lower than any immediately adjacent continuously accessible, upwardly-facing surfaces of the wrecker to the front and rear of the catwalk assembly;

wherein the walking surface extends across the frame and has opposite ends proximate to the left and right sides of the wrecker; and wherein the walking surface is less than or equal to approximately one foot above the frame.

2. The wrecker of claim 1, wherein the walking surface is substantially flat.

3. The wrecker of claim 1, wherein the walking surface is mounted directly to the frame.

4. The wrecker of claim 1, wherein the catwalk assembly further includes a pair of end units located at the opposite ends of the walking surface.

5. The wrecker of claim 4, wherein each of the end units includes at least one step located below the walking surface.

6. The wrecker of claim 5, wherein at least one of the end units further includes a storage compartment.

7. The wrecker of claim 1, wherein the recovery equipment includes at least one of a boom, a wheel-lift, a winch and a vehicle recovery bed.

8. The wrecker of claim 7, wherein the recovery equipment further includes a plurality of storage compartments.

\* \* \* \* \*